United States Patent
Ramini et al.

(10) Patent No.: US 8,601,278 B2
(45) Date of Patent: *Dec. 3, 2013

(54) VALIDATING ACCESS TO A GROUP OF RELATED ELEMENTS

(75) Inventors: Sundaram Ramini, Redmond, WA (US); Joseph S. Beda, Seattle, WA (US); Mark Alcazar, Seattle, WA (US); Roberto A. Franco, Seattle, WA (US); Roland Katsuaki Tokumi, Issaquah, WA (US); John G. Bedworth, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/570,044

(22) Filed: Aug. 8, 2012

(65) Prior Publication Data

US 2012/0304316 A1    Nov. 29, 2012

Related U.S. Application Data

(63) Continuation of application No. 10/867,338, filed on Jun. 14, 2004, now Pat. No. 8,245,049.

(51) Int. Cl.
*G06F 21/00* (2013.01)

(52) U.S. Cl.
USPC .................. 713/182; 713/189; 713/190

(58) Field of Classification Search
None
See application file for complete search history.

(56) References Cited

U.S. PATENT DOCUMENTS

| 5,805,884 | A  | 9/1998  | Sitbon et al. |
| 6,185,567 | B1 | 2/2001  | Ratnaraj et al. |
| 6,272,485 | B1 | 8/2001  | Sragner |
| 6,275,868 | B1 | 8/2001  | Fraley et al. |
| 6,327,608 | B1 | 12/2001 | Dillingham |
| 6,421,729 | B1 | 7/2002  | Paltenghe et al. |
| 6,463,534 | B1 | 10/2002 | Geiger et al. |
| 6,546,397 | B1 | 4/2003  | Rempell |
| 6,567,918 | B1 | 5/2003  | Flynn et al. |
| 6,686,932 | B2 | 2/2004  | Rath et al. |

(Continued)

FOREIGN PATENT DOCUMENTS

WO    WO-2005091107    9/2005

OTHER PUBLICATIONS

"Non-Final Office Action", U.S. Appl. No. 13/149,582, (Jan. 7, 2013), 12 pages.

(Continued)

*Primary Examiner* — Kaveh Abrishamkar
(74) *Attorney, Agent, or Firm* — Wolfe-SBMC

(57) ABSTRACT

A method and system for validating access to a group of related elements are described. The elements within the group access a security context associated with a markup domain when a call is made to an element. An authorized call to an element is enabled such that the markup domain is navigated to a new web page. However, an unauthorized call is prevented so that the navigation to the new web page is not permitted. After the markup domain has been navigated, the security context associated with the markup domain is invalidated. A new security context is generated and associated with the markup domain. The elements associated with the web page navigated from are inaccessible after navigation of the markup domain to the new page. The association of the new security context with the markup domain prevents an unauthorized user from accessing any element that references the previous security context.

20 Claims, 5 Drawing Sheets

(56) References Cited

U.S. PATENT DOCUMENTS

| | | | |
|---|---|---|---|
| 6,717,593 B1 | 4/2004 | Jennings | |
| 6,732,109 B2 | 5/2004 | Lindberg et al. | |
| 6,748,418 B1 | 6/2004 | Yoshida et al. | |
| 6,792,459 B2 | 9/2004 | Elnozahy et al. | |
| 6,874,084 B1 | 3/2005 | Dobner et al. | |
| 6,904,453 B2 | 6/2005 | Shuster et al. | |
| 6,934,757 B1 | 8/2005 | Kalantar et al. | |
| 6,950,983 B1 | 9/2005 | Snavely | |
| 6,959,393 B2 | 10/2005 | Hollis | |
| 6,961,929 B1 | 11/2005 | Pelegri-Llopart et al. | |
| 6,985,953 B1 | 1/2006 | Sandhu et al. | |
| 6,993,596 B2 | 1/2006 | Hinton | |
| 7,000,107 B2 | 2/2006 | Hewett et al. | |
| 7,076,786 B2 | 7/2006 | Burd et al. | |
| 7,143,195 B2 | 11/2006 | Vange | |
| 7,143,347 B2 | 11/2006 | Su | |
| 7,225,225 B2 | 5/2007 | Kuki et al. | |
| 7,293,034 B2 | 11/2007 | Paya et al. | |
| 7,340,604 B2 | 3/2008 | Hewett et al. | |
| 7,359,976 B2 | 4/2008 | Ross et al. | |
| 7,437,558 B2 | 10/2008 | Fenton et al. | |
| 7,458,096 B2 | 11/2008 | Knouse et al. | |
| 7,467,399 B2 * | 12/2008 | Nadalin et al. | 726/2 |
| 7,469,302 B2 | 12/2008 | Whittle et al. | |
| 7,487,262 B2 | 2/2009 | Cardina et al. | |
| 7,735,094 B2 | 6/2010 | Varshney | |
| 7,802,238 B2 | 9/2010 | Clinton | |
| 7,809,785 B2 | 10/2010 | Appleton et al. | |
| 7,912,924 B1 | 3/2011 | Cantrell | |
| 8,245,049 B2 * | 8/2012 | Ramani et al. | 713/182 |
| 2001/0051885 A1 | 12/2001 | Nardulli et al. | |
| 2002/0007317 A1 | 1/2002 | Callaghan et al. | |
| 2002/0116407 A1 | 8/2002 | Negishi et al. | |
| 2002/0124172 A1 | 9/2002 | Manahan | |
| 2002/0161835 A1 | 10/2002 | Ball et al. | |
| 2002/0184491 A1 | 12/2002 | Morgan et al. | |
| 2003/0023873 A1 | 1/2003 | Ben-Itzhak | |
| 2003/0028762 A1 | 2/2003 | Trilli et al. | |
| 2003/0093666 A1 | 5/2003 | Millen et al. | |
| 2003/0159063 A1 | 8/2003 | Apfelbaum et al. | |
| 2004/0015580 A1 | 1/2004 | Lu et al. | |
| 2004/0103200 A1 | 5/2004 | Ross et al. | |
| 2004/0128546 A1 | 7/2004 | Blakley, III et al. | |
| 2004/0139314 A1 | 7/2004 | Cook et al. | |
| 2004/0210536 A1 | 10/2004 | Gudelj et al. | |
| 2004/0260754 A1 | 12/2004 | Olson et al. | |
| 2005/0044197 A1 | 2/2005 | Lai | |
| 2005/0050547 A1 | 3/2005 | Whittle et al. | |
| 2005/0060427 A1 | 3/2005 | Phillips et al. | |
| 2005/0108353 A1 | 5/2005 | Yamamoto | |
| 2005/0174974 A1 | 8/2005 | Sonntag et al. | |
| 2005/0187895 A1 | 8/2005 | Paya et al. | |
| 2005/0223412 A1 | 10/2005 | Nadalin et al. | |
| 2005/0259656 A1 | 11/2005 | Dollar et al. | |
| 2005/0268100 A1 | 12/2005 | Gasparini et al. | |
| 2005/0278792 A1 | 12/2005 | Ramani et al. | |
| 2006/0010134 A1 | 1/2006 | Davis | |
| 2006/0053276 A1 | 3/2006 | Lortz et al. | |
| 2006/0053293 A1 | 3/2006 | Zager et al. | |
| 2006/0143688 A1 | 6/2006 | Futoransky | |
| 2006/0218403 A1 | 9/2006 | Sauve et al. | |
| 2006/0221941 A1 | 10/2006 | Kishinsky et al. | |
| 2007/0006148 A1 | 1/2007 | Varshney | |
| 2007/0050854 A1 | 3/2007 | Cooperstein et al. | |
| 2007/0074169 A1 | 3/2007 | Chess et al. | |
| 2007/0107057 A1 | 5/2007 | Chander et al. | |
| 2007/0113282 A1 | 5/2007 | Ross | |
| 2007/0136809 A1 | 6/2007 | Kim et al. | |
| 2007/0150603 A1 | 6/2007 | Crull | |
| 2007/0162394 A1 | 7/2007 | Zager et al. | |
| 2007/0192494 A1 | 8/2007 | Yamakawa et al. | |
| 2007/0234060 A1 | 10/2007 | Tsubono | |
| 2007/0256003 A1 | 11/2007 | Wagoner et al. | |
| 2007/0282951 A1 | 12/2007 | Selimis | |
| 2007/0288247 A1 | 12/2007 | Mackay | |
| 2008/0034425 A1 | 2/2008 | Overcash et al. | |
| 2008/0059634 A1 | 3/2008 | Commons | |
| 2008/0133540 A1 | 6/2008 | Hubbard et al. | |
| 2008/0263086 A1 | 10/2008 | Klemba et al. | |
| 2008/0298342 A1 | 12/2008 | Appleton et al. | |
| 2008/0313648 A1 | 12/2008 | Wang et al. | |
| 2009/0037806 A1 | 2/2009 | Yang et al. | |
| 2009/0048915 A1 | 2/2009 | Chan | |
| 2009/0070663 A1 | 3/2009 | Fan et al. | |
| 2009/0070869 A1 | 3/2009 | Fan et al. | |
| 2009/0119769 A1 | 5/2009 | Ross et al. | |
| 2009/0125595 A1 | 5/2009 | Maes | |
| 2009/0132713 A1 | 5/2009 | Dutta et al. | |
| 2009/0161132 A1 | 6/2009 | Sato | |
| 2009/0183227 A1 | 7/2009 | Isaacs et al. | |
| 2010/0017461 A1 | 1/2010 | Kokkevis et al. | |
| 2010/0023884 A1 | 1/2010 | Brichford et al. | |
| 2010/0100823 A1 | 4/2010 | Ewe et al. | |
| 2010/0125895 A1 | 5/2010 | Shull et al. | |
| 2010/0262780 A1 | 10/2010 | Mahan et al. | |
| 2010/0281537 A1 | 11/2010 | Wang et al. | |
| 2010/0306642 A1 | 12/2010 | Lowet et al. | |
| 2011/0015917 A1 | 1/2011 | Wang et al. | |
| 2012/0304303 A1 | 11/2012 | Leithead et al. | |
| 2013/0047258 A1 | 2/2013 | Leithead et al. | |

OTHER PUBLICATIONS

"Restriction Requirement", U.S. Appl. No. 13/656,156, (Feb. 21, 2013), 6 pages.

"Advanced Server-Side Authentication for Data Connections in InfoPath 2007 Web Based Forms", http://msdn2.microsoft.com/en-us/library/bb787184.aspx#ip2007AdvancedServerSideAuthentication_OverviewofServerSideAuthenticationScenarios, (Sep. 2007), 10 pages.

"Coding Basics—JavaScript Native Interface (JSNI)", Retrieved from: <http://code.google.com/webtoolkit/doc/1.6/DevGuideCodingBasics.html#DevGuideJavaScriptNativeInterface> on Jan. 28, 2011, 26 pages.

"Final Office Action", U.S. Appl. No. 10/867,338, (May 13, 2008), 6 pages.

"Final Office Action", U.S. Appl. No. 11/935,323, (Jul. 18, 2011), 15 pages.

"Final Office Action", U.S. Appl. No. 11/942,734, (Jan. 21, 2010), 36 pages.

"Final Office Action", U.S. Appl. No. 11/942,734, (Apr. 5, 2011), 45 pages.

"Final Office Action", U.S. Appl. No. 11/942,734, (Sep. 13, 2010), 38 pages.

"Flash Cross Domain XML", http://www.w3.org/TR/2007/WD-access-control-20071001, (Nov. 3, 2007), 1-1.

"Microsoft Security Program: Microsoft Security Bulletin—MS98-020—Patch Available for Frame Spoof Vulnerability", Retrieved from: <http://www.microsoft.com/technet/security/bulletin/ms98-020.mspx> on Jul. 10, 2010, (Dec. 23, 1998), 2 pages.

"Microsoft Windows Internet Explorer and Other Trident Based Browsers", Retrieved from: <http://www.legendscrolls.co.uk/webstandards/ie> on May 25, 2011,(May 20, 2011), 8 pages.

"Microsoft Windows Script Interfaces", Retrieved from: <http://msdn.microsoft.com/en-us/library/t9d4xf28(v=vs.85).aspx> on Jan. 28, 2011, (Aug. 2009), 3 pages.

"Netscape Security News Archive", Available at <http://netscape.1command.com/relnotes/>,(1997),14 pages.

"Non Final Office Action", U.S. Appl. No. 11/935,323, (Nov. 5, 2010), 11 pages.

"Non-Final Office Action", U.S. Appl. No. 10/867,338, (Nov. 15, 2007), 5 pages.

"Non-Final Office Action", U.S. Appl. No. 10/867,338, (Apr. 21, 2010), 15 pages.

"Non-Final Office Action", U.S. Appl. No. 10/867,338, (Jul. 14, 2010), 15 pages.

"Non-Final Office Action", U.S. Appl. No. 11/150,869, (Sep. 3, 2009), 9 pages.

(56) References Cited

OTHER PUBLICATIONS

"Non-Final Office Action", U.S. Appl. No. 11/942,734, (Aug. 7, 2009), 31 pages.
"Non-Final Office Action", U.S. Appl. No. 11/942,734, (Nov. 18, 2010), 43 pages.
"Non-Final Office Action", U.S. Appl. No. 11/942,734, (May 3, 2010), 32 pages.
"NoScript", 2004-2007, *Inform Action*, retrieved from <http://noscript.net/features> on Aug. 23, 2007, 5 pages.
"Notice of Allowance", U.S. Appl. No. 10/303,113, (Dec. 10, 2007), 11 pages.
"Notice of Allowance", U.S. Appl. No. 10/867,338, (Apr. 12, 2012), 8 pages.
"Notice of Allowance", U.S. Appl. No. 11/150,869, (Feb. 9, 2010), 8 pages.
"Protecting Commercial Secure Web Servers from Key-Finding Threats", *nCipher, Inc.*, Available at <www.ncipher.com/uploads/resources/pcws.pdf>,(1999), 12 pages.
"Randomization of HTML Tags and Embedded Scripts in Web Pages", *Microsoft Research*, 2139156v2, retrieved on Nov. 5, 2007, 14 pages.
"Requirement for Information", U.S. Appl. No. 10/867,338, (Oct. 26, 2010), 7 pages.
"Restriction Requirement", U.S. Appl. No. 11/150,869, (May 20, 2009), 6 pages.
"Restriction Requirement", U.S. Appl. No. 13/149,582, (Aug. 6, 2012), 5 pages.
"Tagneto", http://tagneto.blogspot.com/2006/10/ie-7-and-iframe-apis-part-2.html, (Nov. 3, 2007), 1-5.
"Update Available for "Frame Spoof" Security Issue", Retrieved from: <http://support.microsoft.com/default.aspx?scid=kd;en-us;167614&sd=tech> on Apr. 21, 2011,(Aug. 23, 2007), 3 pages.
"What's New in Internet Explorer 8", Retrieved from: <http://msdn.microsoft.com/en-us/library/cc288472(v=vs.85).aspx> on Jan. 28, 2011, (2009), 15 pages.
"Why XHR Should Become Opt-In Cross-Domain", http://www.webkitchen.co.uk/2006/07/why-xhr-should-become-opt-in-cross.html.
Amato, Gianni "Protect Your Browser Mozilla Firefox from XSS Attacks", *XSS Warning: Security extension for Mozilla Firefox*, retrieved from <http://www.gianniamato.it/project/extension/xsswarning/> Nov. 5, 2007,(2007), 1 page.
Anupam, et al., "Secure Web Scripting", *1998 IEEE*, (1998), pp. 46-55.
Barth, Adam "Securing Frame Communication in Browsers", *Communications of the ACM*, vol. 52, No. 6, (Jun. 2009), pp. 83-91.
Chang, Bernice et al., "A Client-Side Browser-Integrated Solution for Detecting and Preventing Cross Site Scripting (XSS) Attacks", available at <http://www.eecg.toronto.edu/~lie/Courses/ECE1776-2006/Updates/XSS_update.pdf>,(Sep. 25, 2006), 3 pages.
Couvreur, Juien "Curiosity is Bliss: Web API Authentication for Mashups", Available at http://blog.monstuff.com/_archives/000296.html, (Jun. 25, 2006), 5 pages.
Crockford, Douglas "JSONRequest", Retrieved from: <http://json.org/JSONRequest.html> on Nov. 3, 2007, (Apr. 17, 2006), 8 pages.
De Keukelaera, Frederik et al., "SMash: Secure Component Model for Cross-Domain Mashups on Unmodified Browsers", *Proceeding of the 17th International Conference on World Wide Web*, Apr. 21-25, 2008, *ACM Press*, New York, NT, USA, (Apr. 21, 2008), 13 pages.
Ernesto, Damiani et al., "A Fine-Grained Control System for XML Documents", *ACM*, (May 2002), pp. 169-202.
Festa, Paul "Communicator subject to frame-spoofing", Retrieved from: <http://news.cnet.com/2100-1023-21975.html&tag=mncol%3btxt> on Oct. 11, 2010, (Jan. 5, 1999), 1 page.
Fu, Kevin et al., "Dos and Don'ts of Client Authentication on the Web", *IEEE, 2002*, (2002), 17 pages.
Grosskurth, Alan et al., "Architecture and Evolution of the Modern Web Browser", David R. Cheriton School of Computer Science, University of Waterloo, Available at <http://grosskurth.ca/papers/browser-archevol-20060619.pdf>,(Jun. 2006), pp. 1-24.

Herzberg, Amir et al., "Protecting (even) Naive Web Users, or: Preventing Spoofing and Establishing Credentials of Web Sites", Bar Ilan University, Available at <www.cs.bu.ac.il/~herzea/papers/ecommerce/trusted credentials area.pdf>,(Jul. 18, 2004), 26 pages.
Horak, Ales et al., "DEBVisDic—First Version of New Client-Server Wordnet Browsing and Editing Tool", In *Proceedings of GWC 2006*, Avilable at <https://www.cs.cas.cz/semweb/download.php?file=06-11-pala-etal&type=pdf>,(Jan. 2006), 5 pages.
Jackson, Collin et al., "Subspace: Secure CrossDomain Communication for Web Mashups", In *Proceedings of the International World Wide Web Conference Committee (IW3C2)*, May 8-12, 2007, available at <http://citeseerx.ist.psu.edu/viewdoc/download?doi=10.1.1.123.1586&rep=rep1&type=pdf>,(May 8, 2007), 10 pages.
Jim, Trevor et al., "Defeating Script Injection Attacks with Browser-Enforced Embedded Policies", In *Proceedings of WWW 2007*, May 8-12, 2007, available at <http://www2007.org/papers/paper595.pdf>,(May 8, 2007), pp. 601-610.
Joshi, James B., et al., "Security Models for Web-Based Applications", *Communications of the ACM*, (Feb. 2001), 10 pages.
Kaminsky, Dan "Black Ops 2007: Design Reviewing The Web", *IOActive Comprehensive Computer Security Services*, Available at <http://www.doxpara.com/DMK_BO2K7_Web.ppt>,(2007), 67 pages.
Karlof, Chris et al., "Dynamic Pharming Attacks and Locked Same-origin Policies for Web Browsers", In Proceedings of CCS 2007,(Nov. 2007), pp. 58-71.
Kirda, Engin et al., "Noxes: A Client-Side Solution for Mitigating Cross-Site Scripting Attacks", *Proceedings of SAC '06*, Apr. 23-27, 2006, available at <http://www.seclab.tuwien.ac.at/papers/noxes.pdf>,(Apr. 23, 2006), 8 pages.
Komathy, K et al., "Security for XML messaging services—a component-based approach", *Jounal of Network and Computer Applications*, (2003), 15 pages.
Levin, Lori et al., "The JANUS-III Translation System: Speech-to-Speech Translation in Multiple Domains", Machine Translation, vol. 15,(2000), pp. 3-25.
Ley, Jim "Using the XML HTTP Request object", Retrieved from: <http://www.jibbering.com/2002/4/httprequest.2005.8.html> on Nov. 4, 2010, (Apr. 2002), 6 pages.
Matthies, Christian "DNS Pinning Explained", Retrieved from: <http://christ1an.blogspot.com/2007/07/dns-pinning-explained.html> on Nov. 3, 2007, (Jul. 1, 2007), 12 pages.
Melez, Myk et al., "Mozilla Application Framework in Detail", Retrieved from: <https://developer.mozilla.org/en/mozilla_application_framework_in_detail> on Jan. 28, 2011, (Feb. 15, 2006), 6 pages.
Miyamoto, Daisuke et al., "SPS: A Simple Filtering Algorithm to Thwart Phishing Attacks", *AINTEC 2005*, (2005), 15 pages.
Nielson, Jordan et al., "Benchmarking Modern Web Browsers", Department of Computer Science, University of Calgary, Available at <http://www.aqualab.cs.northwestern.edu/HotWeb08/papers/Nielson-BMW.pdf>,(Oct. 2008), pp. 1-6.
Novak, Mark "Extending SDL: Documenting and Evaluating the Security Guarantees of Your Apps", *MSDN Magazine*, available at <http://msdn.microsoft.com/en-us/magazine/cc163522.aspx>,(Nov. 2006), 6 pages.
Radosevic, Danijel et al., "Development of a Higher-Level Multimedia Scripting Language", *23rd Int. Conf. Information Technology Interfaces ITI 2001*, (Jun. 19, 2001), pp. 201-208.
Samarati, Pierangela et al., "An Authorization Model for a Distributed Hypertext System", *IEEE Transactions on Knowledge and Data Engineering*, vol. 8, No. 4, (Aug. 1996), pp. 555-562.
Spanias, Andreas et al., "Development of New Functions and Scripting Capabilities in Javaa-DSP for Easy Creation and Seamless Integration of Animated DSP Simulations in Web Courses", *2001 IEEE*, (2001), pp. 2717-2720.
Tam, et al., "A Fast and Flexible Framework of Scripting for Web Application Development: A Preliminary Experience Report", *2000 IEEE*, (2000), pp. 450-455.

(56) References Cited

OTHER PUBLICATIONS

Van Kesteren, Anne "Cross Domain HXR Enabling Read Access for Web Resourced", http://www.w3.org/TR/2007/WD-access-control-20071001/, (Nov. 3, 2007),1-12.

Verisign Inc., "Licensing VeriSign Certificates: Securing Multiple Web Server and Domain Configurations", *White Paper*, Available at <www.msctrustgate.com/pdf/licensing.pdf>, (Nov. 2, 2001), 15 pages.

Zoline, Kenneth O., "An Approach for Interconnections SNA and XNS Networks", In Proceedings of SIGCOMM 1985,(1985), pp. 184-198.

"Non-Final Office Action", U.S. Appl. No. 13/656,156, (Apr. 2, 2013),13 pages.

"Final Office Action", U.S. Appl. No. 13/656,156, (09/17/20130), 15 pages.

"Notice of Allowance", U.S. Appl. No. 13/149,582, (Sep. 18, 2013), 15 pages.

\* cited by examiner

BEFORE NAVIGATION

AFTER NAVIGATION

VALIDATING ACCESS TO A GROUP OF RELATED ELEMENTS

RELATED APPLICATION

This application is a continuation of, and claims priority to U.S. patent application Ser. No. 10/867,338, filed on Jun. 14, 2004, the disclosure of which is incorporated by reference herein.

BACKGROUND

Information stored on the internet may become available to unauthorized users who exploit security vulnerabilities. A common exploit involves a web site that includes two frames that a user may navigate to. One frame may select and cache an object in the other frame. When the one frame causes the other frame to navigate to another web site, the one frame may use the cached object to access unauthorized data in the other frame. The one frame may then upload the unauthorized data to the original web site.

For example, a hypertext markup language object includes a reference to a markup domain from which it was created. The object may be cached in one domain. During subsequent navigation to another web site, the markup domain associated with the object may change. The cached object may be exploited to access the contents of an inner document associated with the changed markup domain. An unauthorized user may exploit this security vulnerability to obtain information that is intended to be unavailable to the user.

SUMMARY

The present invention is directed toward a method and system for validating access to a group of related elements. The group of elements may be associated with the same markup domain or separate domains when generated. The elements within the group include a reference to a security context associated with the markup domain. The security context is an identity associated with a web page when an element is created on the web page. The security context is accessed when a call is made to an element to authorize the call. An authorized call to an element is enabled such that the markup domain is navigated to a new web page. However, an unauthorized call is prevented or invalidated so that the navigation to the new web page is not permitted. Thus, objects that are cached from the old web page cannot be exploited to access unauthorized data associated with the new web page.

After the markup domain has been navigated to a new web page, the security context associated with the markup domain is invalidated. A new security context is generated and associated with the markup domain. The elements associated with the web page navigated from are inaccessible after navigation of the markup domain to the new web page. The association of the new security context with the markup domain prevents an unauthorized user from accessing any element that references the previous security context.

According to one aspect of the invention, a computer-implemented method validates access to a first element within a group of related elements. A security context is associated with each element within the group of related elements. Access to the first element is verified by comparing a security context associated with the first element with a security context associated with a second element that is requesting access to the first element. Access to the first element is invalidated when the security context associated with the first element does not match the security context associated with the second element.

According to another aspect of the invention, the security context associated with the second element is modified in response to navigating a markup page associated with the first element.

DETAILED DESCRIPTION

Overview

Briefly stated, a method and system for validating access to a group of related elements are described. The group of elements is associated with the same markup domain or separate domains when generated. The elements within the group include a reference to a security context associated with the markup domain. Calls to the elements may be validated against the security context. When a navigation to a new web page occurs, the markup domain navigated is associated with a new security context. The previous security context is modified such that any elements associated with it can no longer be used. The objects associated with the previous security context therefore become inaccessible because the checks against the security context before invoking an application program interface (API) on that object will no longer succeed. Accordingly, a previous security breach that allowed access to these objects is made secure by the present invention.

Example Environment

Figure 1:
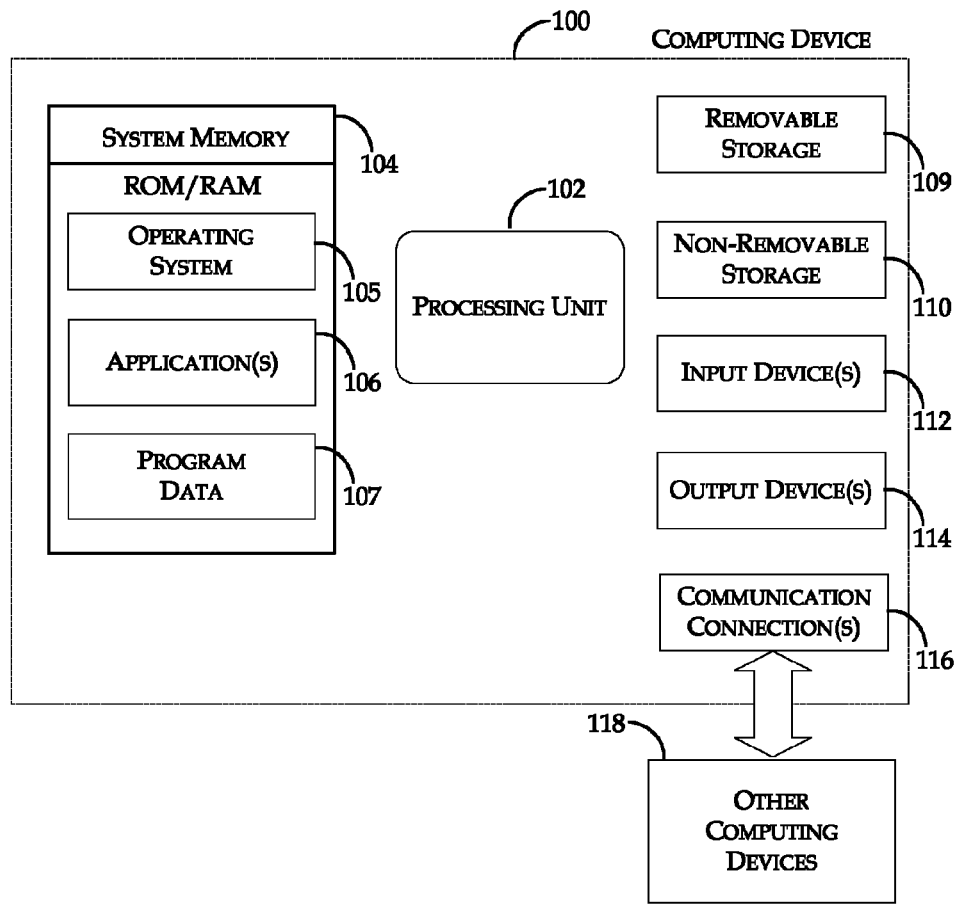
FIG. 1 illustrates a computing device that may be used according to an example embodiment of the present invention.

With reference to FIG. 1, one example system for implementing the invention includes a computing device, such as computing device 100. Computing device 100 may be configured as a client, a server, mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. The present invention, which is described in detail below, is implemented within system memory 104.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Validating Access to a Group of Related Objects

Figure 2:
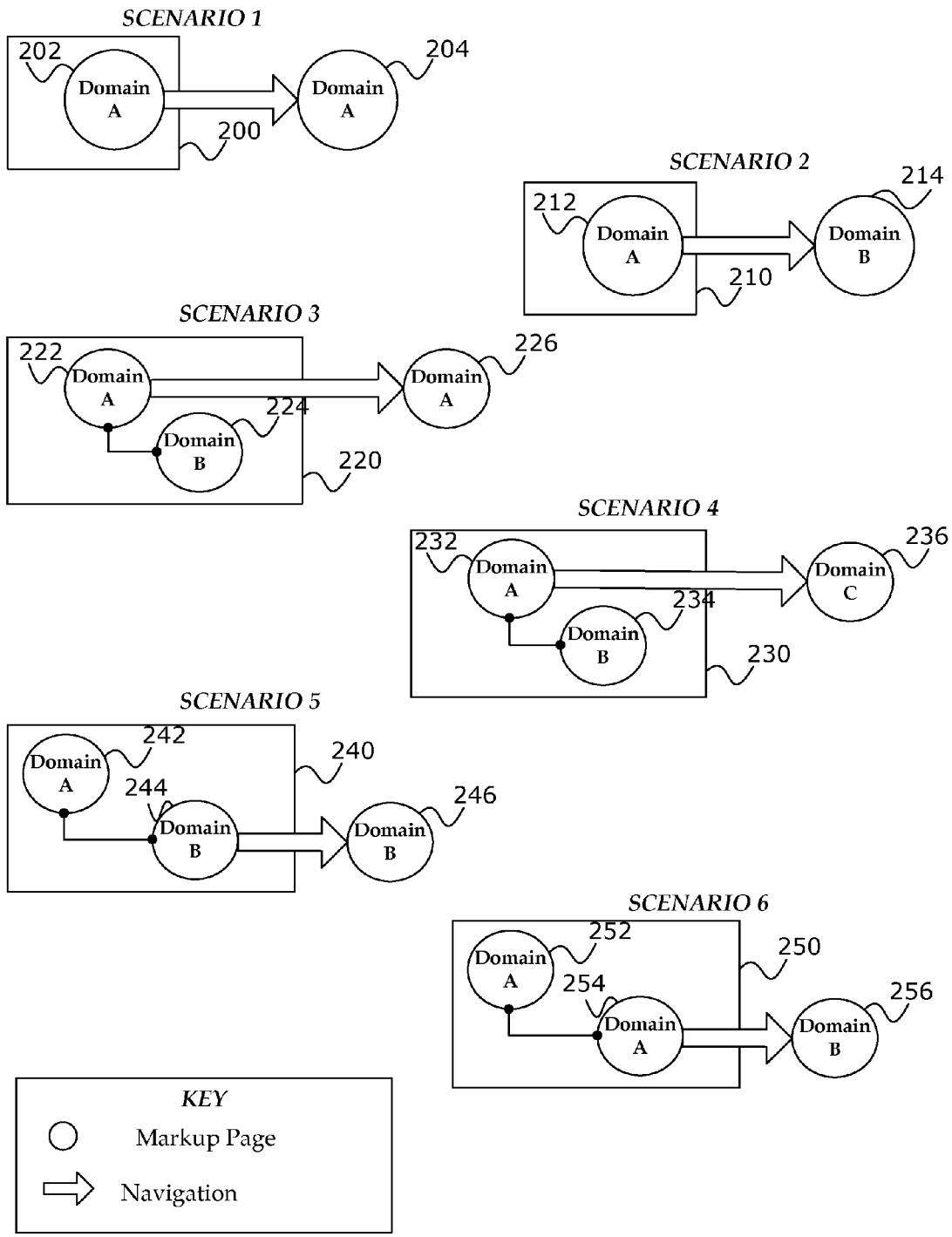
FIG. 2 is a functional block diagram illustrating six different web navigation scenarios, in accordance with the present invention.

FIG. 2 shows a functional block diagram illustrating six different web navigation scenarios. The following scenarios are meant to illustrate possible navigations that may occur in the context of a network. Scenarios other than those shown may be contemplated, and the scenarios shown are not meant as an exhaustive list of possible navigation scenarios.

For purposes of this application, markup page refers to a document that provides the parameters for the layout of a navigable site associated with a domain within a computer network. Element refers to an item within a markup page that a user may access and perform operations upon. A security context is an identity associated with a markup domain when objects are created within the markup domain. The security context addresses the vulnerability of exploiting an object in a cache to access unauthorized information while navigating the markup domain.

In Scenario 1, window 200 hosts markup page 202. Markup page 202 is associated with a particular domain (e.g., domain A). A navigation occurs to new markup page 204 within the same domain (e.g., domain A).

In Scenario 2, window 210 hosts markup page 212. Markup page 212 is associated with a particular domain (e.g., domain A). A navigation occurs to a new markup page 214 in a different domain (e.g., domain B).

In Scenario 3, window 220 hosts markup page 222 and markup page 224. Markup page 224 may not be a different page from markup page 222, but may instead be a frame within markup page 222. For example, markup page 222 may be the topmost page in window 220, and markup page 224 is a lower level page in a frame within window 220. Markup page 222 is associated with a first domain (e.g., domain A) and markup page 224 is associated with a second domain (e.g., domain B). In another embodiment, both markup pages 222, 224 are associated with the same domain (e.g., domain A). In this scenario, the top markup page (e.g., 222) is navigated to new markup page 226 associated with the same domain (e.g., domain A).

In Scenario 4, window 230 hosts markup page 232 and markup page 234. Markup page 234 may not be a different page from markup page 232, but may instead be a frame within markup page 232. For example, markup page 232 may be the topmost page in window 230, and markup page 234 is a lower level page in a frame within window 230. Markup page 232 is associated with a first domain (e.g., domain A) and markup page 234 is associated with a second domain (e.g., domain B). In another embodiment, both markup pages 232, 234 are associated with the same domain (e.g., domain A). In this scenario, the top markup page (e.g., 232) is navigated to new markup page 236 associated with a different domain (e.g., domain C).

In Scenario 5, window 240 hosts markup page 242 and markup page 244. Markup page 244 may not be a different page from markup page 242, but may instead be a frame within markup page 242. For example, markup page 242 may be the topmost page in window 240, and markup page 244 is a lower level page in a frame within window 240. Markup page 242 is associated with a first domain (e.g., domain A) and markup page 244 is associated with a second domain (e.g., domain B).

In Scenario 6, window 250 hosts markup page 252 and markup page 254. Markup page 254 may not be a different page from markup page 252, but may instead be a frame within markup page 252. For example, markup page 252 may be the topmost page in window 250, and markup page 254 may be a lower level page in a frame within window 250. Both markup pages 252, 254 are associated with the same domain (e.g., domain A). In this scenario, the lower level page (e.g., 254) is navigated to new markup page 256 associated with a different domain (e.g., domain B).

Before navigation, markup page 252 may access markup page 254 through window 250 or via document objects. Markup page 252 caches an object within markup page 254. After navigation to domain B, markup page 252 retains access to the cached object in new markup page 256. The invention prevents use of the cached object to read data from markup page 256.

Scenario 6 is described in greater detail with respect to FIGS. 3 and 4 below to illustrate the affect of the present invention on a navigation scenario. However, the present invention is applicable to the other scenarios (e.g., Scenarios 1-5) or other possible network navigations for improving security.

Figure 3:
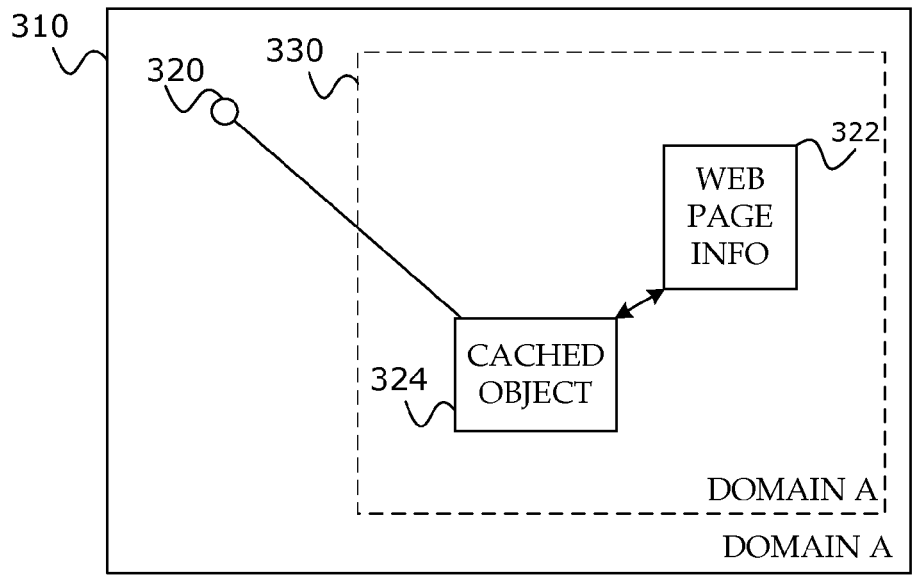
FIG. 3 is a functional block diagram illustrating a prior art arrangement of in-memory components before and after navigation to a web page.
Figure 3:
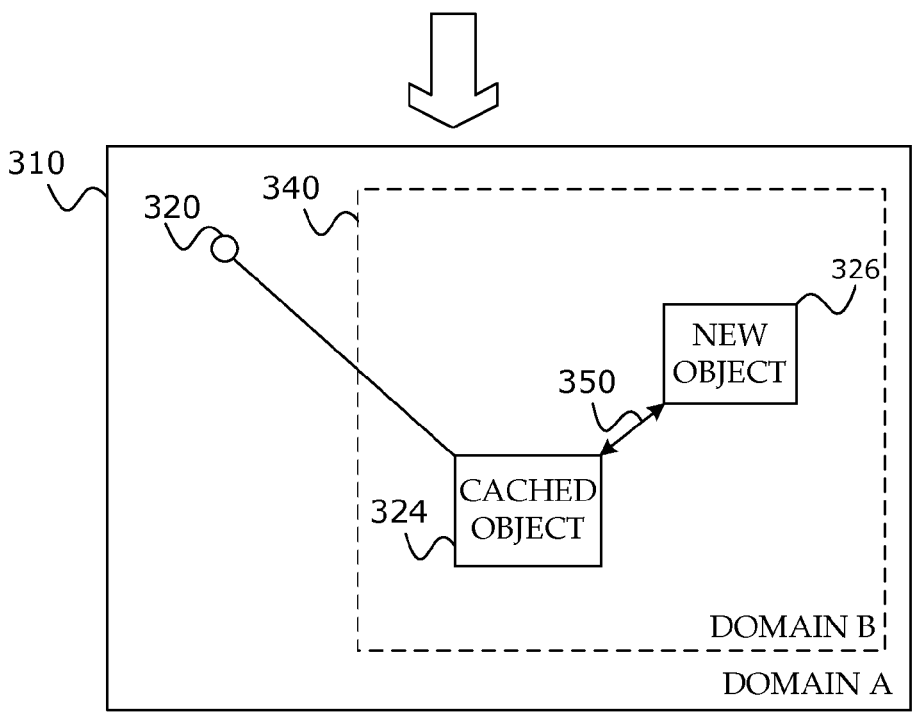

FIG. 3 is a functional block diagram illustrating a prior art arrangement of in-memory components before and after navigation of a subframe within a web page. The components include markup page 310, elements 320, 322, 324, 326, and subframes 330, 340. Markup page 310 is hosted by the network site and is associated with domain A. Elements 320, 322, 324, 326 are located at markup page 310. Element 322 includes web page information. Element 320 is located within markup page 310 and caches element 324 in subframe 330 such that element 324 is a cached object that is stored in a local cache. Elements 322, 324 are located within subframe 330. A user may navigate subframe 330 dynamically to another markup page in domain B such that element 324 may still link to other objects that are specific to the new markup page inside subframe 340. Thus, information associated with the new markup page may still be obtained from element 324.

After navigation of subframe 330 to subframe 340 within domain B, the configuration of the in-memory components is modified, as shown in the lower portion of FIG. 3. Element 322 is replaced by element 326 which is a new object that includes new information associated with domain B. Element 324 is included within sub frame 340 after navigation because the script code associated with markup page 310 maintains a link to element 324 via the local cache established by element 320 before navigation to subframe 340.

Security checks are followed when accessing element 326 such that only authorized users in domain B are allowed to access element 326 from any element in markup page 310. However, the link between element 324 and element 326 (shown as path 350) has not been removed or placed under similar security, such that element 326 may be accessed using the object in the local cache (i.e., element 324) via element 320 in markup page 310. The presence of the object in the local cache permits unauthorized access to element 326 along path 350 and all associated elements (e.g., any elements associated with element 326) within subframe 340 without encountering any security checks. Thus, the security vulnerability of element 324 stored in the local cache may be exploited to gain unauthorized access to elements within domain B.

Figure 4:
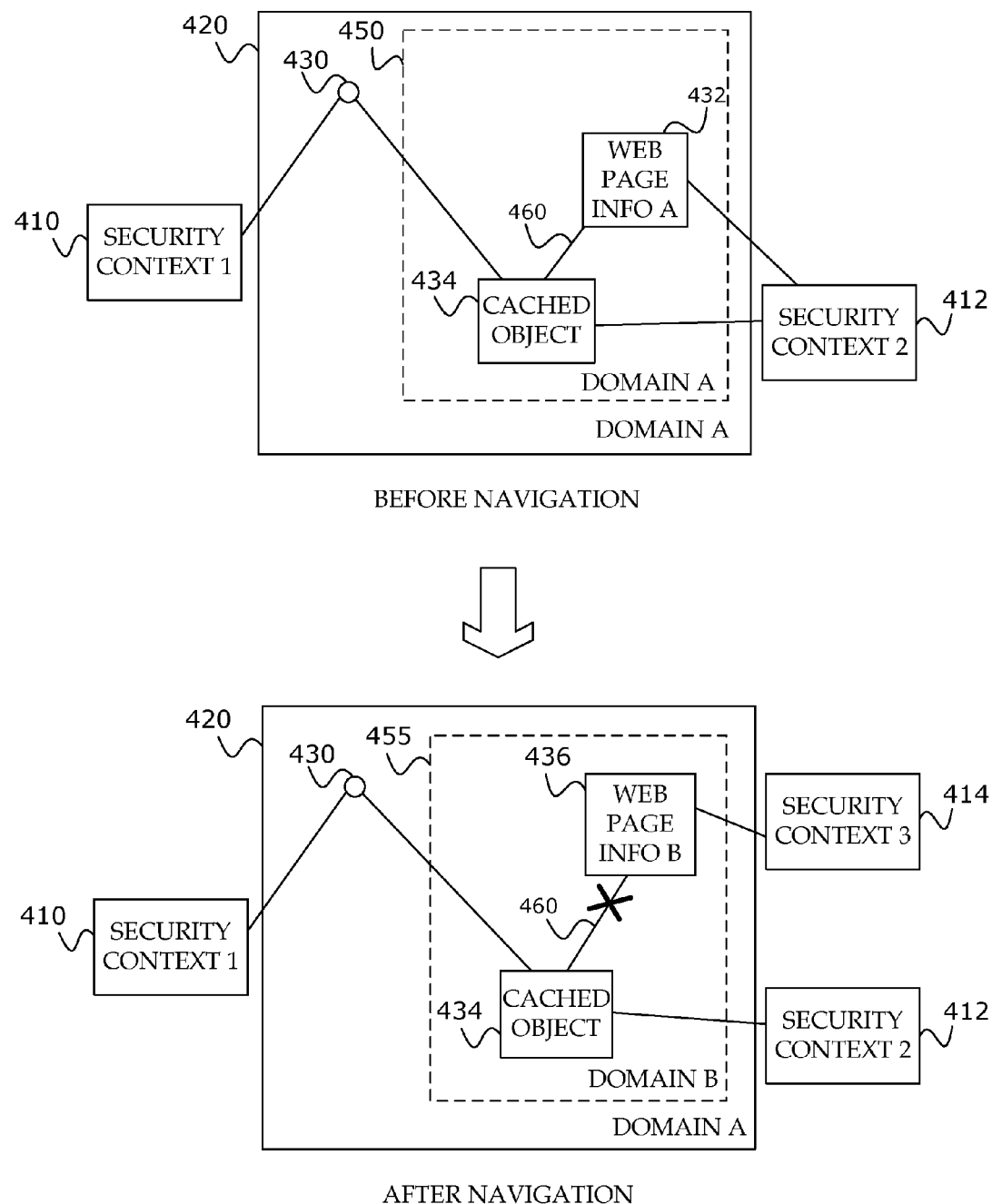
FIG. 4 is a functional block diagram illustrating a system for validating access to a group of related elements, in accordance with the present invention.

FIG. 4 is a functional block diagram illustrating a system for validating access to a group of related elements, in accordance with aspects of the invention. The arrangement of in-memory components is shown before and after navigation of a subframe within a web page. The components include security context 1 410, security context 2 412, security context 3 414, markup page 420, elements 430, 432, 434, 436 and subframes 450, 455.

Markup page 420 is hosted by the network site and is associated with domain A. Elements 430-434 are located at markup page 420 in domain A. Elements 432, 434 are located within subframe 450 in domain A. Element 432 includes web page information associated with domain A. Element 434 is a cached object that is stored in a local cache in markup page 420 in domain A. Elements 430-434 may be any item that can be individually selected and manipulated during network navigation. In another embodiment, elements 430-434 may include nested frames created from a markup page.

Security context 1 410 is associated with element 430 in markup page 420. Security context 2 412 is associated with elements 432, 434 in subframe 450. Elements that could be created in the context of a markup domain associated with markup page 420 may inherit the same security context. If a new navigable markup page is created, it is assigned a unique security context.

Security context 1 410 provides context for actions taken on markup page 420. Security context 2 412 provides context for actions taken on subframe 450. For example, security context 2 412 is accessed to determine if an action taken on subframe 450 is permitted. If the action is not permitted, the action is invalidated. In one embodiment, when element 434 calls to element 432 along path 460, the call is directed to security context 2 412. Any time an element is called through an interface, the security context associated with the element is accessed to determine if the user is authorized to initiate execution of the call. Security context 2 412 enables or disables the call depending on whether the user who is navigating subframe 450 is authorized to access element 432 from element 434. For example, the call is disabled when an unauthorized user attempts to access element 432 from element 434 via element 430 in markup page 420 if markup page 420 is in a different domain than element 432.

If the user requesting access to element 432 is authorized, the call to element 432 is enabled. A new subframe associated with element 432 is navigated when the call to element 432 is a navigation to different markup domain (e.g., domain B). The lower portion of FIG. 4 shows the arrangement of the in-memory components after navigation of subframe 450 within domain A to subframe 455 in domain B. Element 432 is replaced by element 436 which is a new object that includes web page information associated with domain B. Security context 2 412 is invalidated with regard to element 436 (as indicated by the X in path 460) after navigation to subframe 455. Element 436 is associated with new security context 3 414 since element 436 was created as a new navigable markup page in subframe 455. Subsequent navigation from element 434 to element 436 is not permitted because security context 2 412 is not valid for element 436. In one embodiment, unauthorized calls from element 434 to element 436 result in an "access denied" error. Any security context may be invalidated because the markup domain associated with the web page is not reused. The security contexts of all objects that could navigate to the markup domain (e.g., nested frames) are also invalidated.

Security context 3 414 is created and associated with element 436 when subframe 455 is navigated in domain B. Security context 3 414 is associated with all subsequent elements created in subframe 455. In one embodiment, security context 3 414 may be created even if subframe 455 is located in the same domain as subframe 450 (e.g., domain A). The creation of security context 3 414 prevents an unauthorized user from accessing any object that references security context 3 414. For example, a user who is only authorized to access objects associated with security context 2 412 is not permitted to access objects associated with security context 3 414. Execution of a call to any object associated with security context 3 414 is denied because security context 2 412 is invalidated with regard to elements associated with security context 3 414.

After navigation of subframe 455, path 460 is invalidated by the creation of security context 3 414 because element 436 is associated with security context 3 414. Elements associated with one security context may not access elements associated with a different security context. Therefore, an unscrupulous user with access to the object in a local cache can no longer exploit the security vulnerability described in reference to FIG. 3 to access unauthorized information in domain B.

The security context may have a large number of associated elements. All of the elements associated with the security context may be easily invalidated by modifying the security context. Thus, a large group of elements may be rendered inaccessible without having to reference the objects individually because all the elements are linked to the same security context.

Many elements may be created that are associated with one markup page. Some elements may include a direct reference to the markup page. Thus, it is unnecessary to cache the security context on such elements because the associated security context is included with the original markup page, which may be easily referred to by such elements. A direct reference to the markup page also provides an indirect reference to the corresponding security context.

For some elements, providing a reference to the markup page may not be secure, or it may not be possible to reference the markup page at all times. In these cases, the security context remains linked to the element such that the element may be locally cached safely. Every element remains associated with the correct security context whether the security context is a local cache or a reference to the markup page.

The security context of the present invention as described in reference to FIG. 4 may also be utilized for the other scenarios described in reference to FIG. 2. For example, a new security context may be associated with a new markup page regardless of whether the new markup page is located within the same domain as the previous markup page. Navigation scenarios other then those described may also take advantage of the security context functionality of the present invention.

Figure 5:
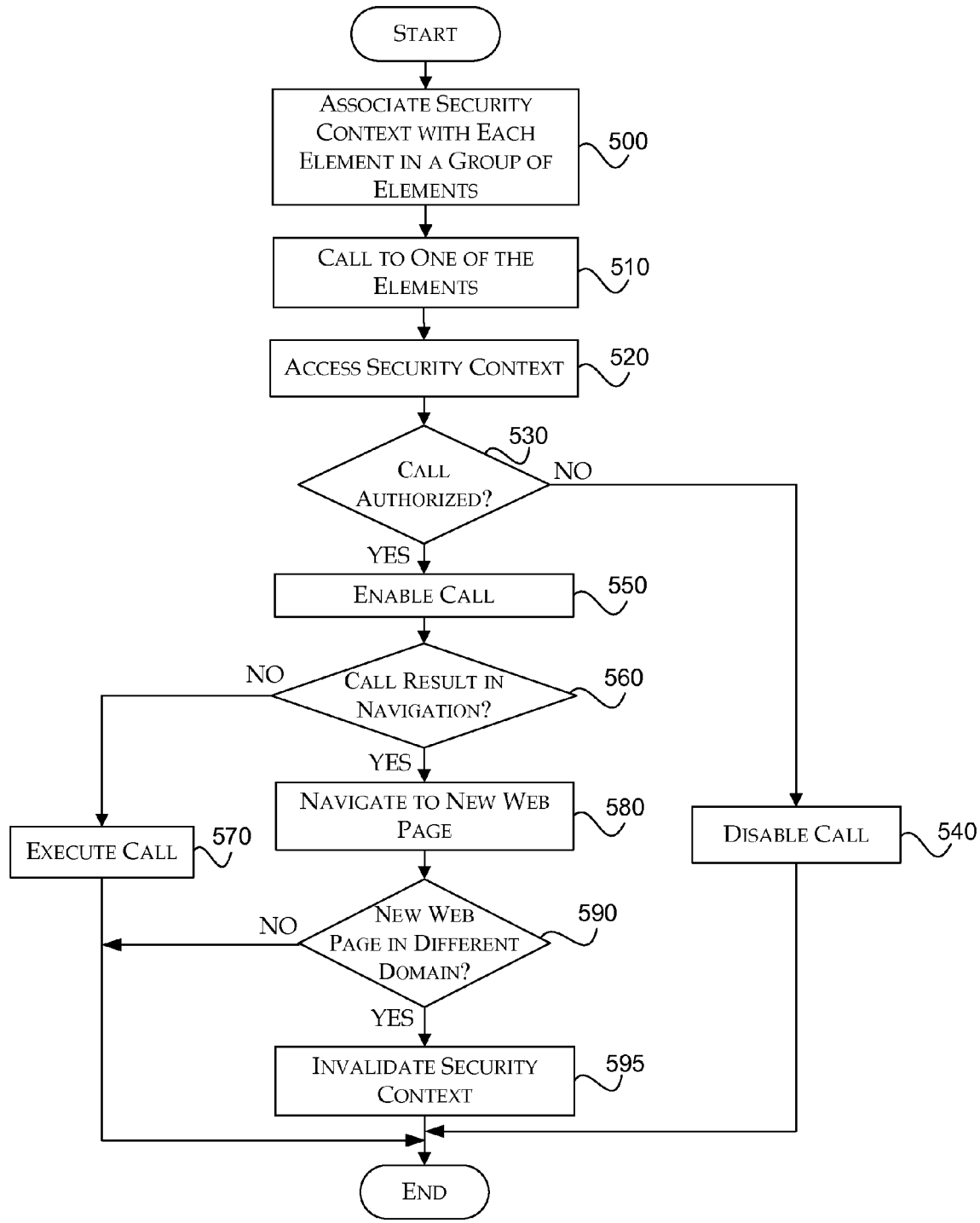
FIG. 5 is an operational flow diagram illustrating a process for validating access to a group of related elements, in accordance with the present invention.

FIG. 5 illustrates a process for validating access to a group of related elements, in accordance with aspects of the invention. The group of related elements may be associated with the same markup domain or different domains when generated. The process moves to block 500 where a security context is associated with each element in the group of related elements. Each element in the group includes a reference to the same security context. In one embodiment, each element that could be created in the context of the markup domain inherits the same security context.

Proceeding to block 510, a call is made to one of the elements. Moving to block 520, the security context associated with the element is accessed by the scripting engine. The security context is accessed whenever an element is called through an interface.

Advancing to decision block 530, a determination is made whether the call to the element is authorized. The determination is performed by inspecting the security context associated with the element. If the security context permits authorization of the call, processing moves to block 550. If the call is not authorized, processing continues at block 540.

Transitioning to block 540, the call to the element is disabled. In one embodiment, an "access denied" error occurs when a subsequent unauthorized call is made to the element along the same navigation path. The process then terminates at an end block.

Continuing to block 550, the call to the element is enabled. Moving to decision block 560, a determination is made whether the call results in web page navigation. If the call results in web page navigation, processing continues at block 580. If the call does not result in web page navigation, processing continues at block 570.

Proceeding to block 570, the call is executed without navigating to a web page. For example, reading a title of a page is a type of call in which the title element is protected but web navigation is not required. The process then terminates at the end block.

Moving to block 580, the new page associated with the markup domain is navigated. In one embodiment, the new page that is navigated may be a subframe or a web page located in the same domain as the markup domain.

Advancing to decision block 590, a determination is made whether the new web page is located in a different domain than the markup domain. If the new web page is located in a different domain than the markup domain, processing continues at block 595. If the new web page is located in the same domain as the markup domain, processing terminates at the end block.

Transitioning to block 595, the security context associated with the element is invalidated. In one embodiment, the security contexts of the elements that could navigate the markup domain are also invalidated. In another embodiment, the security context is invalidated by modifying the security context to create a new security context associated with the element. Modifying the security context invalidates all associated elements such that the new security context prevents an unauthorized user from accessing any element that references the previous security context. The process then terminates at the end block.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. One or more computer-readable storage device embodying computer-readable instructions which, when executed, implement a method for validating access to a first element within a group of related elements, comprising:
   associating a security context with each element within the group of related elements; wherein the group of related elements is generated from the same markup domain;
   verifying access to the first element when the security context associated with the first element permits access to the first element;
   invalidating access to the first element when the security context associated with the first element does not permit access to the first element;
   wherein all elements that could be generated from a markup domain are associated with the same security context; and
   wherein the security context associated with the first element comprises an in-memory component.

2. The computer-readable storage device of claim 1, further comprising modifying a security context associated with a second element in response to navigating a markup page associated with the first element.

3. The computer-readable storage device of claim 2, wherein the markup page is navigated from a first domain to a second domain.

4. The computer-readable storage device of claim 1, wherein invalidating access further comprises disabling a call to the first element.

5. The computer-readable storage device of claim 1, further comprising validating access to the first element when the security context associated with the first element permits access to the first element.

6. The computer-readable storage device of claim 5, wherein validating access further comprises enabling a call to the first element.

7. The computer-readable storage device of claim 1, wherein associating a security context further comprises associating the same security context with each element in the group of related elements.

8. A system for validating access to a first element within a group of related elements, comprising:
   a computing device configured to be coupled to a network that is configured to provide access to web pages, the computing device including an application that is configured to:
   associate a security context with each element within the group of related elements;
   verify access to the first element when the security context associated with the first element permits access to the first element;

invalidate access to the first element when the security context associated with the first element does not permit access to the first element;

navigate a markup page associated with the first element; and modify the security context associated with a second element in response to navigating the markup page.

9. The system of claim 8, wherein the markup page is navigated from a first domain to a second domain.

10. The system of claim 8, wherein the group of related elements is generated from the same markup domain.

11. The system of claim 8, wherein all elements that could be generated from a markup domain are associated with the same security context.

12. The system of claim 8, wherein the application is further configured to invalidate access by disabling a call to the first element.

13. The system of claim 8, wherein the application is further configured to validate access to the first element when the security context associated with the first element permits access to the first element.

14. The system of claim 13, wherein the application is further configured to validate access by enabling a call to the first element.

15. The system of claim 8, wherein the application is further configured to associate a security context by associating the same security context with each element in the group of related elements.

16. A computer-implemented method for validating access to a first element within a group of related elements, comprising:

associating a security context with each element within the group of related elements, each element being associated with a markup domain;

verifying access to the first element when the security context associated with the first element permits access to the first element;

validating access to the first element when the security context associated with the first element permits access to the first element;

invalidating access to the first element when the security context associated with the first element does not permit access to the first element; and modifying a security context associated with a second element in response to navigating a markup page associated with the first element; wherein the markup page is navigated from a first domain to a second domain.

17. The computer-implemented method of claim 16, wherein invalidating access further comprises disabling a call to the first element.

18. The computer-implemented method of claim 16, wherein all elements that could be generated from a markup domain are associated with the same security context.

19. The computer-implemented method of claim 16, wherein validating access further comprises enabling a call to the first element.

20. The computer-implemented method of claim 16, wherein associating a security context comprises associating the same security context with each element in the group of related elements.

* * * * *